(12) United States Patent
Arakawa

(10) Patent No.: US 11,412,105 B2
(45) Date of Patent: Aug. 9, 2022

(54) DATA PROCESSING DEVICE

(71) Applicant: FUJIFILM Business Innovation Corp., Tokyo (JP)

(72) Inventor: Takamasa Arakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 355 days.

(21) Appl. No.: 16/354,213

(22) Filed: Mar. 15, 2019

(65) Prior Publication Data

US 2019/0373134 A1 Dec. 5, 2019

(30) Foreign Application Priority Data

Jun. 1, 2018 (JP) .............................. JP2018-106080

(51) Int. Cl.
*G06K 9/00* (2022.01)
*H04N 1/32* (2006.01)
*G06F 16/51* (2019.01)

(52) U.S. Cl.
CPC ......... *H04N 1/32283* (2013.01); *G06F 16/51* (2019.01)

(58) Field of Classification Search
CPC ....... H04N 19/00024; H04N 19/00139; H04N 19/00315; H04N 19/00448; H04N 1/32283; H04N 1/32244; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; G06F 16/51; G06F 16/50; G06F 21/34; G06F 21/00; G06F 21/606; G06F 16/2365; G06F 16/152; G06F 2221/2151; H04L 63/12; H04L 9/3297; H04L 2209/38

See application file for complete search history.

(56) References Cited

U.S. PATENT DOCUMENTS

| | | | | |
|---|---|---|---|---|
| 10,521,878 B1 * | 12/2019 | Medina, III | .............. | G06T 1/20 |
| 2008/0178120 A1 * | 7/2008 | Yamamoto | .............. | G06F 16/50 |
| | | | | 715/838 |
| 2016/0239653 A1 * | 8/2016 | Loughlin-Mchugh | ...................... | |
| | | | | G06F 21/35 |
| 2017/0103285 A1 * | 4/2017 | Le Borgne | ............ | G06T 1/0028 |
| 2019/0268162 A1 * | 8/2019 | Sahagun | ............... | H04L 9/0891 |

(Continued)

FOREIGN PATENT DOCUMENTS

| | | |
|---|---|---|
| JP | 2005210479 | 8/2005 |
| JP | 2008141692 | 6/2008 |
| JP | 2008242994 | 10/2008 |

(Continued)

OTHER PUBLICATIONS

Office Action of Japan Counterpart Application, with English translation thereof, dated Feb. 8, 2022, pp. 1-8.

*Primary Examiner* — Duy M Dang
(74) *Attorney, Agent, or Firm* — JCIPRNET

(57) ABSTRACT

A data processing device includes an image data receiving section that receives image data, a data conversion section that converts the image data received by the image data receiving section into data having a format different from a format of the received image data, and a hash value generation section that generates a hash value of the data obtained by conversion of the data conversion section from the received image data.

20 Claims, 16 Drawing Sheets

(56) References Cited

U.S. PATENT DOCUMENTS

2020/0068013 A1 * 2/2020 Zakharov ............ H04L 63/0428

FOREIGN PATENT DOCUMENTS

| | | |
|---|---|---|
| JP | 2009049975 | 3/2009 |
| JP | 2011097492 | 5/2011 |
| JP | 5858506 | 2/2016 |
| WO | 2017136879 | 8/2017 |

* cited by examiner

DATA PROCESSING DEVICE

CROSS-REFERENCE TO RELATED APPLICATIONS

This application is based on and claims priority under 35 USC 119 from Japanese Patent Application No. 2018-106080 filed Jun. 1, 2018.

BACKGROUND

(i) Technical Field

The present invention relates to a data processing device.

(ii) Related Art

JP2008-141692A discloses an image processing apparatus that generates image data by reading a paper surface and processes the image data. The image processing apparatus includes a scanning processing unit that reads a paper surface and outputs image data, a time stamp processing unit that generates a time stamp based on the image data and outputs the time stamp, and a time-stamped image-data creation processing unit that acquires the time stamp and outputs the image data with embedding the time stamp in the image data.

JP2009-049975A discloses an information processing apparatus which includes a digital information generation unit that continuously generates digital information, an identifier assigning unit that assigns a different identifier to each piece of first digital information generated by the digital information generation unit, an attribute setting unit that sets an attribute of each piece of first digital information with including the identifier, and an electronic-signature performing unit that performs an electronic signature on the digital information in which the attribute including the identifier assigned to each piece of first digital information has been set by the attribute setting unit.

SUMMARY

For example, image data read by a reading device or image data obtained by imaging of an imaging device may, strictly speaking, vary every time reading or imaging is performed. Therefore, for example, a hash value which has been directly generated from the image data read by the reading device or the image data obtained by imaging of the imaging device may vary every time reading or imaging is performed.

Aspects of non-limiting embodiments of the present disclosure relate to a data processing device in which it is possible to easily cause hash values generated using the identical pieces of image data to be equal to each other in comparison to a case where the hash value is directly generated from image data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a data processing device which includes an image data receiving section that receives image data, a data conversion section that converts the image data received by the image data receiving section into data having a format different from a format of the received image data, and a hash value generation section that generates a hash value of the data obtained by conversion of the data conversion section from the received image data.

BRIEF DESCRIPTION OF THE DRAWINGS

Exemplary embodiment (s) of the present invention will be described in detail based on the following figures, wherein.

DETAILED DESCRIPTION

Hereinafter, exemplary embodiments of the present invention will be described in detail with reference to the drawings. In the following descriptions, the identical members are denoted by the identical reference signs, and repetitive descriptions thereof will be omitted. The following descriptions will be made for the desirable form to which the present invention is applied. The present invention is not limited to the form which will be described below.

Figure 1:
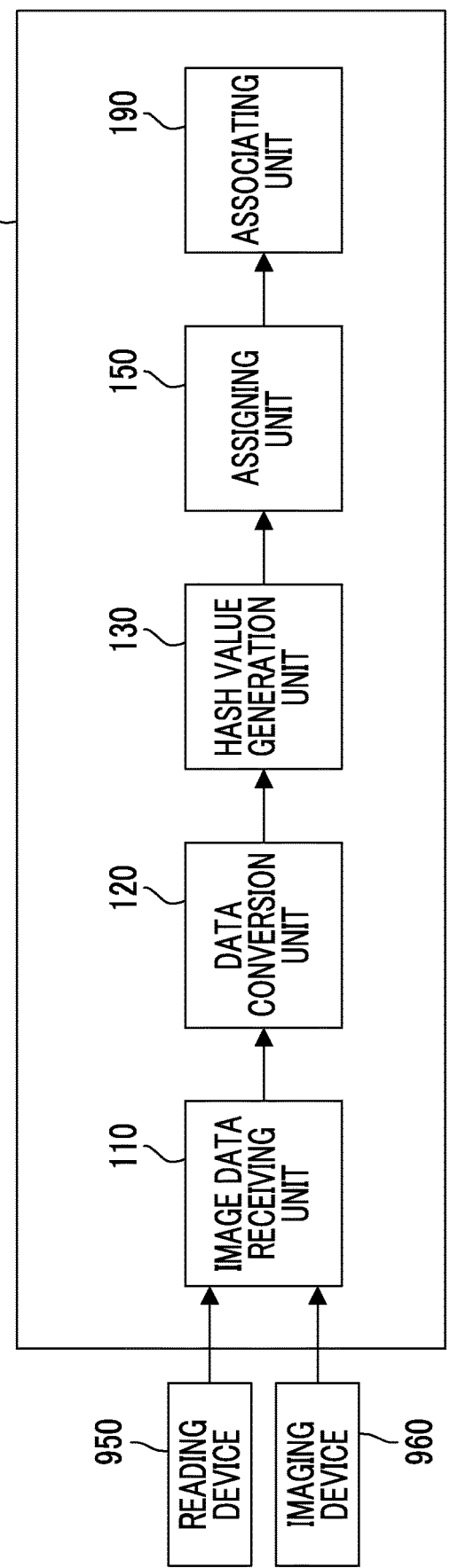
FIG. 1 is a schematic diagram illustrating a configuration of a data processing device according to a first exemplary embodiment.

FIG. 1 is a block diagram illustrating a configuration of a data processing device 10 according to a first exemplary embodiment of the present invention. As illustrated in FIG. 1, the data processing device 10 includes an image data receiving unit 110. The image data receiving unit 110 is an example of an image data receiving section. For example, the image data receiving unit 110 receives image data from a reading device 950 or an imaging device 960. FIG. 1 illustrates an example in which the image data receiving unit 110 receives image data from the reading device 950 or the imaging device 960 other than the data processing device 10. However, the image data receiving unit 110 may receive image data from a reading device or an imaging device which is provided in the data processing device 10.

The data processing device 10 further includes a data conversion unit 120. The data conversion unit 120 is an example of a data conversion section. The data conversion unit 120 converts image data received by the image data receiving unit 110 into data having a format different from that of the received image data. Examples of the above data may include feature data of the image data. Here, the feature data is data obtained by quantify the degree of features provided in data.

Examples of the feature data may include text data obtained by converting image data, for example. Examples of the text data as an example of the feature data may include characters, documents, names of objects shown in image data, such as "dog", "cat", "vacuum cleaner", and "airplane", and feelings or expressions of a person, which are shown in image data, such as "smile", "happy", and "surprised".

As another example of the above-described feature data, processed data obtained by processing image data may be exemplified. The processed data which is another example of the feature data may include an outline which is coordinate data of a result obtained by detecting an edge, the frequency of an appearance of colors such as R, G, and B, the frequency of an appearance of luminance, or image data obtained by monochrome conversion.

As still another example of the above-described feature data, data (referred to as "processed data" below) obtained by processing text data obtained by conversion from image data may be exemplified. The processed data which is still another example of the feature data may include the frequency (histogram data of words) of an appearance of words in text data, coordinate data which is a result of principal component analysis of a word, and semantic data which is data obtained by performing semantic analysis on text data, for example.

The data processing device 10 further includes a hash value generation unit 130. The hash value generation unit 130 is an example of a hash value generation section. The hash value generation unit 130 generates a hash value of data obtained by conversion of the data conversion unit 120 from image data. Here, the hash value refers to a return value of a hash function. The hash function is a function that obtains a numerical value representing data in a case where the data is given.

The data processing device 10 further includes an assigning unit 150. The assigning unit 150 is an example of an electronic signature assigning section. The assigning unit 150 assigns an electronic signature generated from a hash value generated by the hash value generation unit 130, to the data obtained by conversion of the data conversion unit 120 from image data. The assigning unit 150 is an example of a time stamp assigning section, and assigns a time stamp generated by using a hash value generated by the hash value generation unit 130, to data obtained by conversion of the data conversion unit 120. Details of the assigning unit 150 will be described later.

Here, the electronic signature is an electronic certificate given to an electromagnetic record (electronic document) and corresponds to a seal or a signature in a paper document. The time stamp is an electronic time-point certificate verifying that electronic data has definitely existed at a certain time point.

The data processing device 10 further includes an associating unit 190. The associating unit 190 is an example of an associating section. The associating unit 190 is used for associating the other piece of image data with one piece of image data and verifying the existence of the other piece of image data at a specific time, in a case where it is verified that the one piece of image data has been existed at the specific time. Details of the associating unit 190 will be described later.

Figure 2:
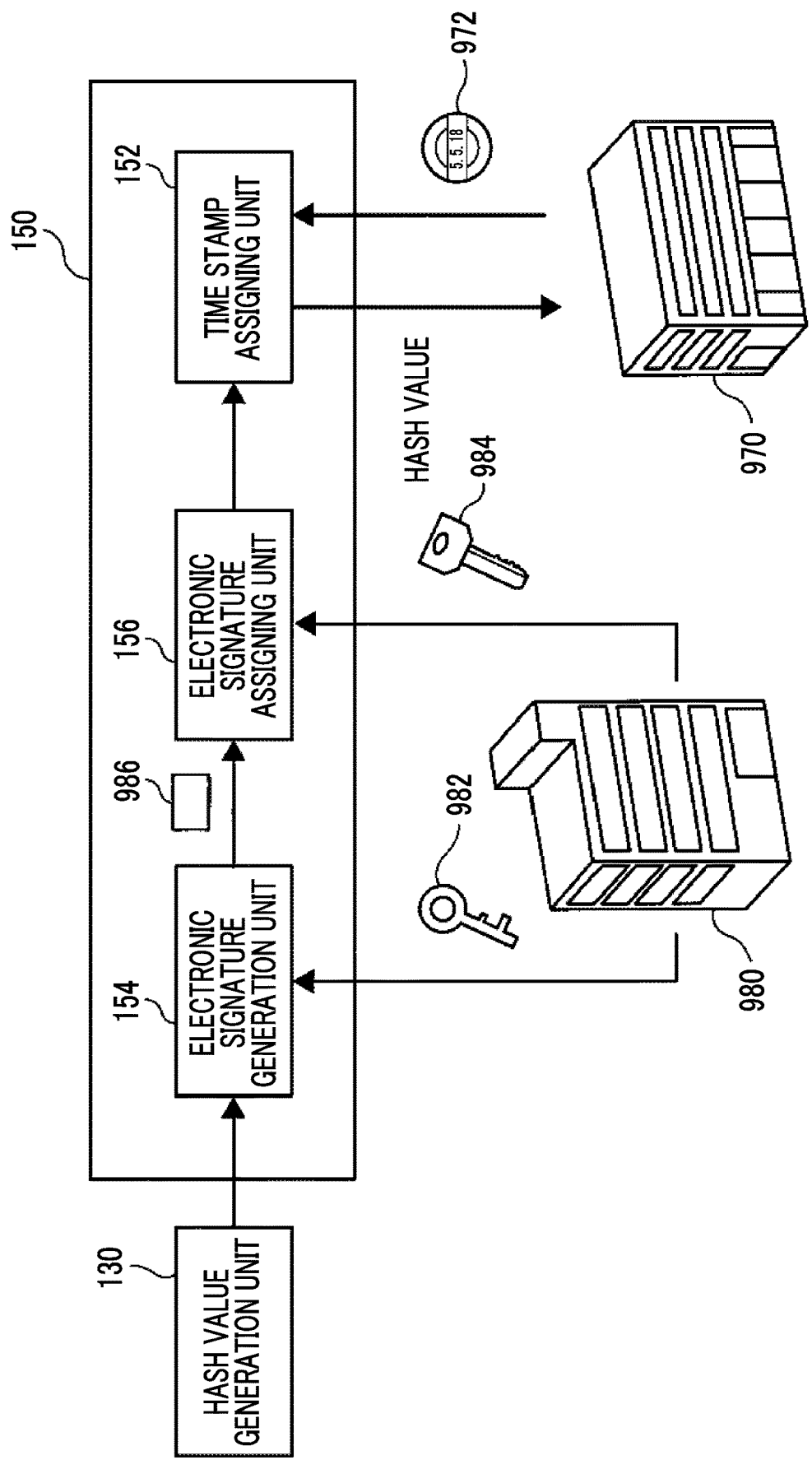
FIG. 2 is a block diagram illustrating a first example of an assigning unit.

FIG. 2 illustrates a first example of the assigning unit 150. As illustrated in FIG. 2, the first example of the assigning unit 150 includes an electronic signature generation unit 154. The electronic signature generation unit 154 generates an electronic signature 986 by encrypting a hash value generated by the hash value generation unit 130 with a private key 982 issued from a certificate station 980.

The first example of the assigning unit 150 further includes an electronic signature assigning unit 156. The electronic signature assigning unit 156 adds the electronic signature 986 generated by the electronic signature generation unit 154 to, for example, data obtained by conversion of the data conversion unit 120. Further, the electronic signature assigning unit 156 assigns a public key 984 issued from the certificate station 980 to, for example, data obtained by conversion of the data conversion unit 120.

The first example of the assigning unit 150 further includes a time stamp assigning unit 152. The time stamp assigning unit 152 transmits a hash value generated by the hash value generation unit 130 to a time stamp station 970, and receives a time stamp 972 in which time-point information has been combined with the hash value and signing has been performed with a private key of the time stamp station, from the time stamp station 970. The time stamp assigning unit 152 assigns the time stamp 972 received from the time stamp station 970, to data obtained by conversion of the data conversion unit 120.

Figure 3:
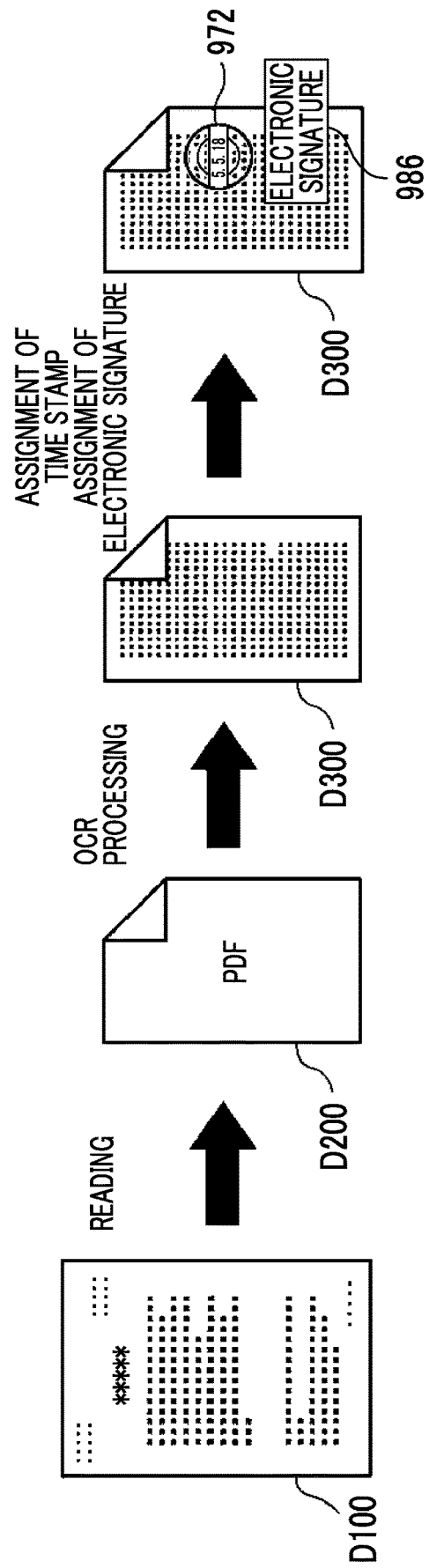
FIG. 3 is a diagram illustrating processing in which the data processing device including the first example of the assigning unit assigns an electronic signature and a time stamp.

FIG. 3 illustrates a specific example of processing in which the data processing device 10 including the first example of the assigning unit 150 assigns an electronic signature 986 and a time stamp 972 to data. In the specific example, a paper document D100 which is, for example, a contract is read by the reading device 950. Image data D200 which is image data having, for example, a PDF format is generated by the reading device 950. The image data receiving unit 110 receives the generated image data D200.

The data conversion unit 120 performs OCR processing on the image data D200 so as to convert the image data D200 into text data D300 as an example of another kind of data. A hash value D400 of the text data D300 is generated by the hash value generation unit 130.

The assigning unit 150 generates an electronic signature 986 from the hash value D400 and assigns the electronic signature 986 to the text data D300, and assigns a time stamp 972 generated using the hash value D400 to the text data D300.

Figure 4:
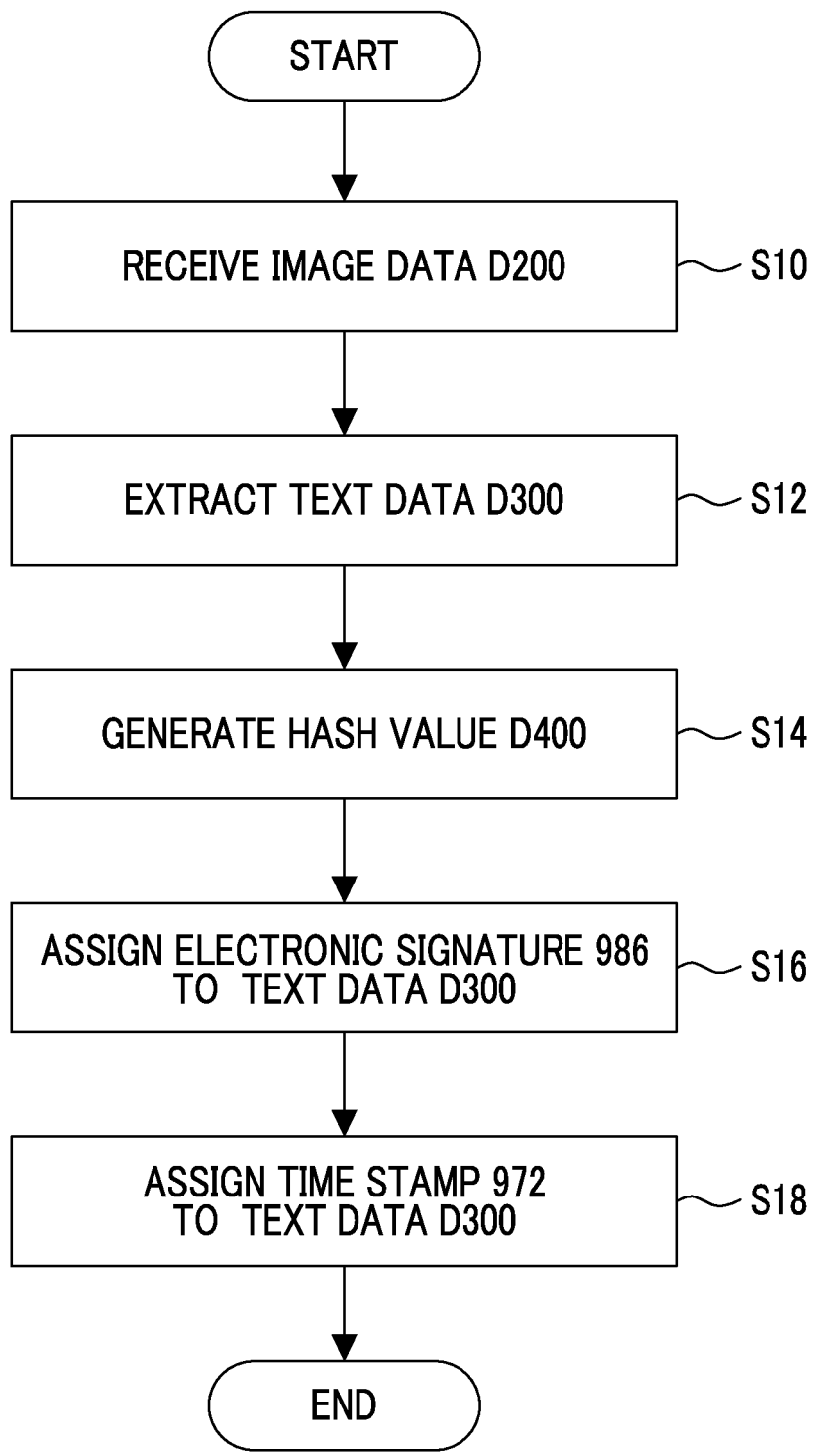
FIG. 4 is a flowchart illustrating the processing in which the data processing device including the first example of the assigning unit assigns the electronic signature and the time stamp.

FIG. 4 is a flowchart illustrating an example of processing in which the data processing device 10 including the first example of the assigning unit 150 assigns an electronic signature 986 and a time stamp 972 to image data.

As illustrated in FIG. 4, in a case where a series of processes starts, in Step S10 which is a first step, the image data receiving unit 110 receives image data D200 of a paper document D100 from the reading device 950.

In Step S12 which is the next step, the data conversion unit 120 converts the image data D200 received in Step S10 into another kind of data. More specifically, the data conversion unit 120 extracts text data D300 from the image data D200.

In Step S14 which is the next step, the hash value generation unit 130 generates a hash value D400 from the text data D300.

In Step S16 which is the next step, the assigning unit 150 assigns an electronic signature 986 to the text data D300. At this time, the assigning unit 150 uses a private key 982 acquired from the certificate station 980 which is a certificate authority.

Then, in Step S18, the assigning unit 150 assigns a time stamp 972 to the text data D300 subjected to signing (text data D300 to which the electronic signature 986 has been assigned) by using the time stamp station 970. Then, the series of processes ends.

The text data D300 to which the electronic signature 986 and the time stamp 972 have been assigned is stored in a storage unit of which an illustration is omitted.

Figure 5:
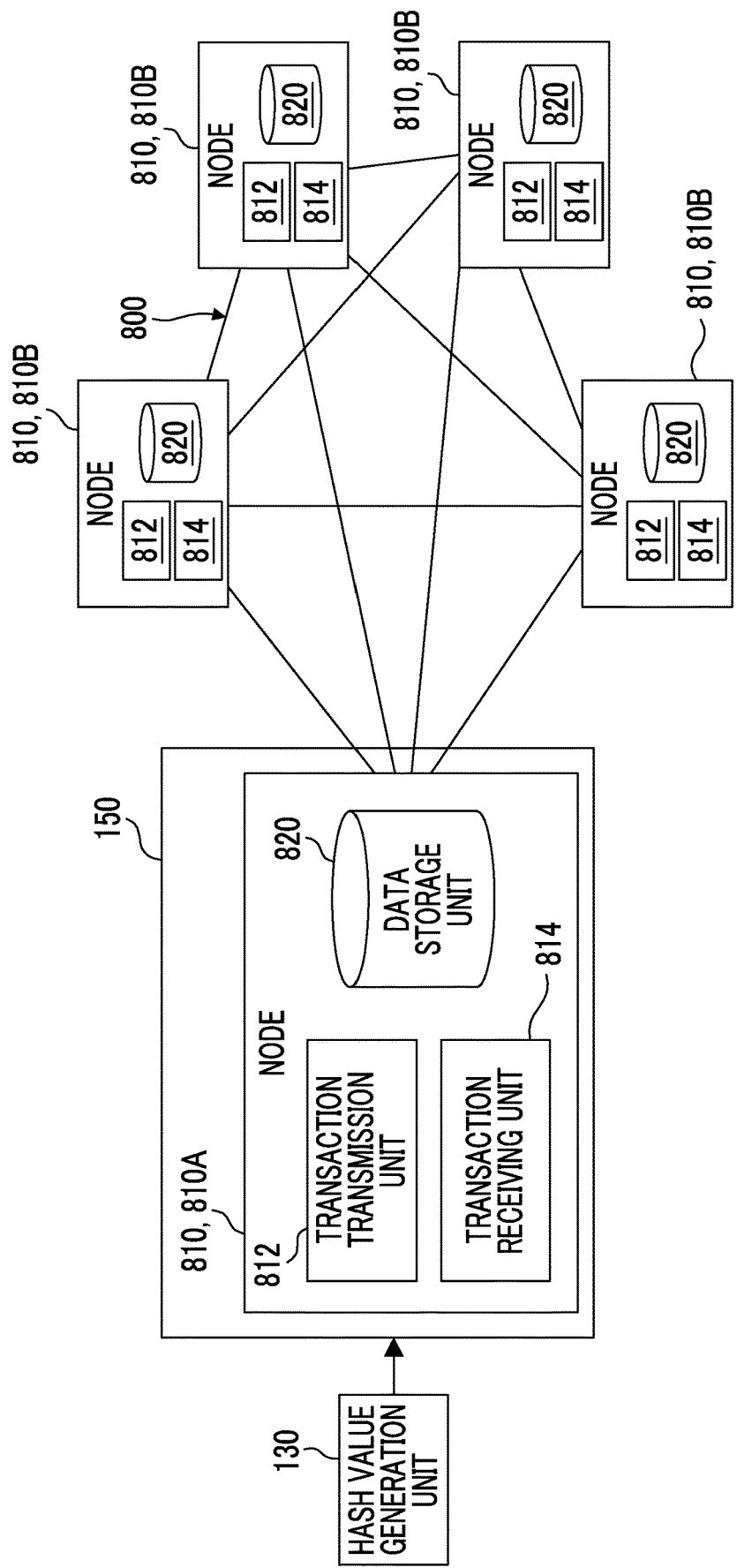
FIG. 5 is a diagram illustrating a second example of the assigning unit.

FIG. 5 illustrates a second example of the assigning unit 150. As illustrated in FIG. 5, the second example of the assigning unit 150 is connected to a peer-to-peer network 800 including plural nodes 810. For example, the assigning unit 150 functions as one of the above-described plural nodes 810. In the following descriptions, a configuration in which the assigning unit 150 functions as one of the plural nodes 810 will be described as an example. However, the assigning unit 150 may not function as one of the plural nodes 810.

Here, the node refers to each component constituting a network. Peer-to-peer is one of architectures in a case where communication is performed between plural terminals and is a communication type in which peers forming a pair or the like communicate with each other.

In the data processing device 10 including the second example of the assigning unit 150, each of the plural nodes 810 forms a distributed ledger of a block chain, in which a hash value of another kind of data obtained by conversion from image data is recorded and stored. The existence of the image data at a specific time is verified in the node 810 on the network 800. That is, in the data processing device 10 including the first example of the assigning unit 150 described above, the existence of image data at a specific time is verified by a time stamp 972 issued from the time stamp station 970. However, in this data processing device 10, the existence of the image data is verified by a block chain on the peer-to-peer network 800.

Here, the block chain is a database in which a unit of data referred to as a block is generated at a predetermined time interval and data is stored by linking the blocks like chains. In the following descriptions, a node 810 which is the assigning unit 150 may be described as a node 810A, and nodes 810 other than the node 810A may be described as nodes 810B.

As illustrated in FIG. 5, the node 810 includes a transaction transmission unit 812, a transaction receiving unit 814, and a data storage unit 820. The transaction transmission unit 812 transmits data to another node 810. The transaction receiving unit 814 receives data transmitted from another node 810, verifies the data, and adds the data to the data storage unit 820. The data storage unit 820 stores a database constituting a distributed ledger of a block chain and stores a hash value of another kind of data obtained by conversion of image data. Here, the transaction is a process unit which is integral and indivisible by putting together plural processes which relate to each other and depend on each other. Here, the distributed ledger refers to a technology in which a large number of participants share the identical books while avoiding discrepancies between the books, or the like.

Here, as the node 810B, for example, a personal computer, a server, or various kinds of IoT equipment may be used.

Figure 6:
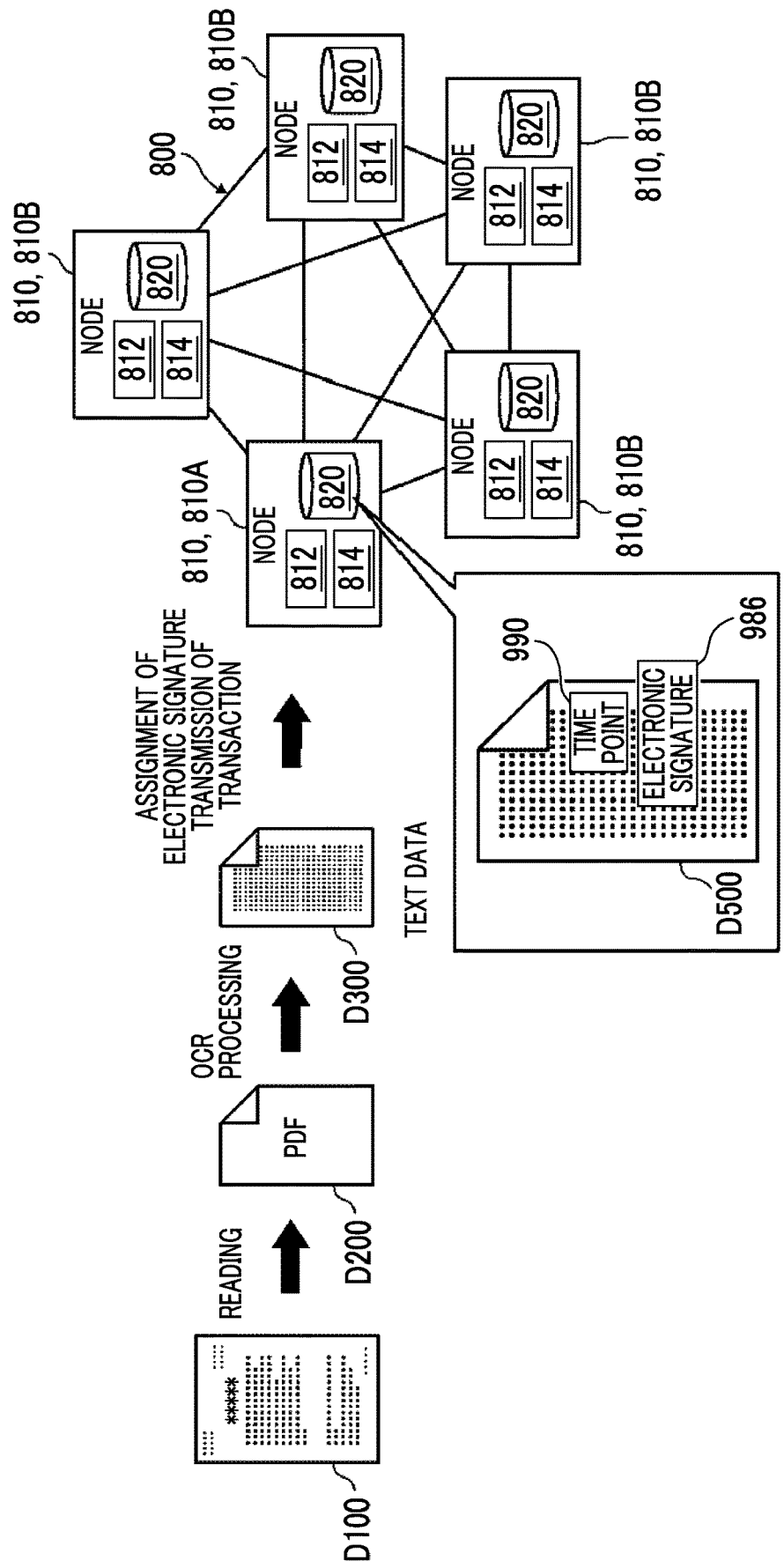
FIG. 6 is a first diagram illustrating processing of verifying an existence of data with an electronic signature in a manner that the data processing device including the second example of the assigning unit assigns the electronic signature to the data.

FIG. 6 illustrates a specific example of processing in which a node 810 constituting a peer-to-peer network 800 verifies the existence of data at a specific time in the data processing device 10 including the second example of the assigning unit 150. In the processing, the assigning unit 150 assigns an electronic signature 986 to data, and a hash value of the data having the electronic signature 986 assigned thereto is recorded in the node 810 along with the date. Here, it is assumed that the time point includes an hour, a minute, a second, and a day.

In the specific example, a paper document D100 is read by the reading device 950, image data D200 which is image data having, for example, a PDF format is generated, and the image data receiving unit 110 receives the generated image data D200.

The data conversion unit 120 performs OCR processing on the image data D200 so as to convert the image data D200 into text data D300 as another kind of data. A hash value D400 of the text data D300 is generated by the hash value generation unit 130.

The assigning unit 150 assigns an electronic signature 986 generated by encrypting the hash value D400 with a private key which has been prepared in advance, to the text data D300. The transaction transmission unit 812 transmits a hash value D500 of the text data D300 having an electronic signature 986 assigned thereto, to plural nodes 810.

The hash value D500 transmitted to the plural nodes 810 is recorded in the data storage unit 820 provided in each of the plural nodes 810, along with a time point 990.

Figure 7:
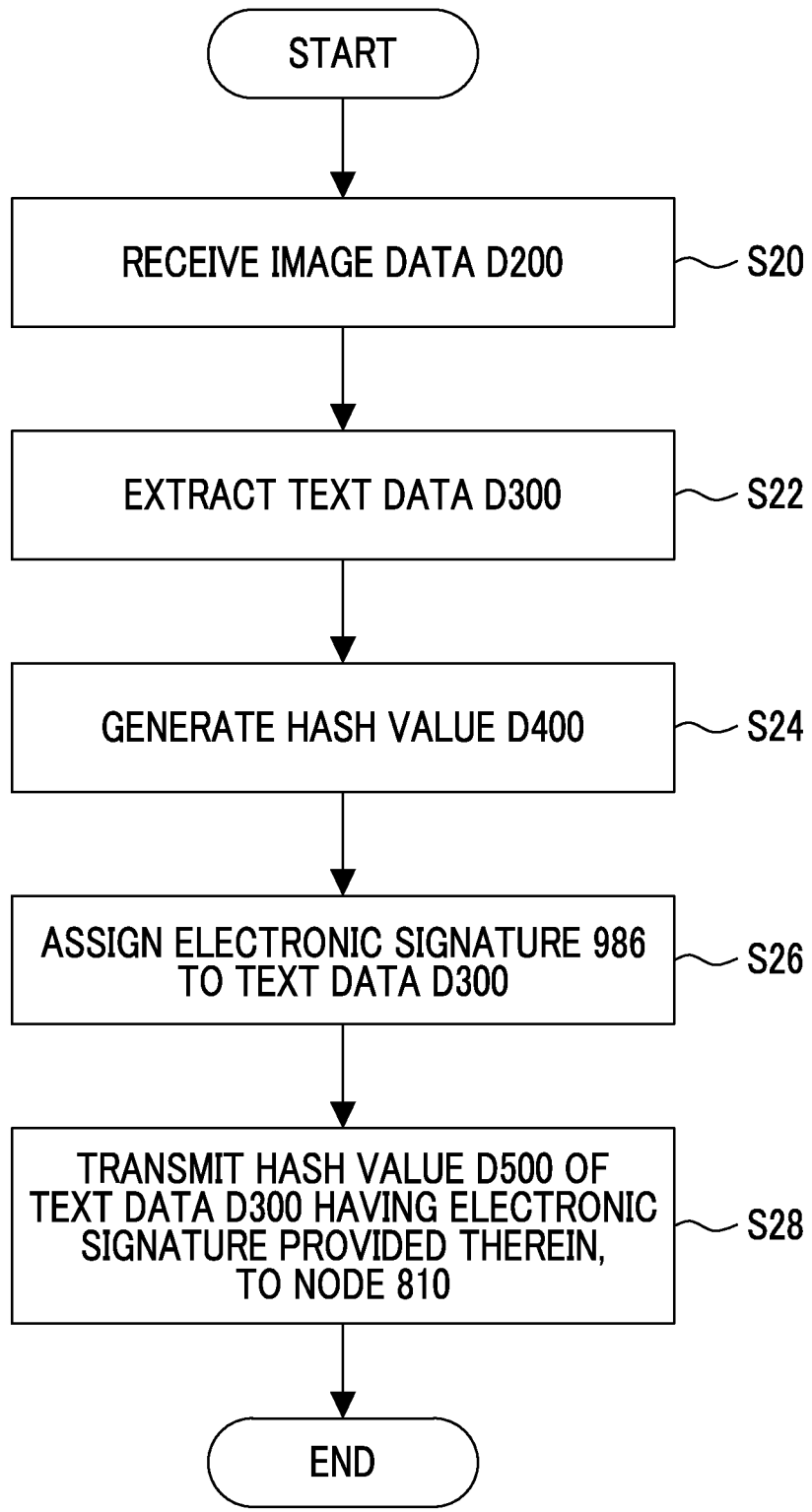
FIG. 7 is a second diagram illustrating the processing of verifying the existence of the data with the electronic signature in a manner that the data processing device including the second example of the assigning unit assigns the electronic signature to the data.

FIG. 7 is a flowchart illustrating a specific example of processing in which a node 810 constituting a peer-to-peer network 800 verifies the existence of image data at a specific time in the data processing device 10 including the second example of the assigning unit 150.

As illustrated in FIG. 7, in a case where a series of processes starts, in Step S20 which is a first step, the image data receiving unit 110 receives image data D200 of a paper document D100 read by the reading device 950.

In Step S22 which is the next step, the data conversion unit 120 converts the image data D200 received in Step S20 into another kind of data. More specifically, the data conversion unit 120 extracts text data D300 from the image data D200.

In Step S24 which is the next step, the hash value generation unit 130 generates a hash value D400 from the text data D300.

In Step S26 which is the next step, the assigning unit 150 assigns an electronic signature 986 generated by encrypting the hash value D400, to the text data D300. At this time, as the private key, a private key which has been generated in advance for using a block chain is used.

In Step S28 which is the next step, the assigning unit 150 generates a hash value D500 of the text data D300 having an electronic signature 986 assigned thereto (text data D300 subjected to signing). The transaction transmission unit 812 transmits the hash value D500 to plural nodes 810. Then, a series of processes ends.

The hash value D500 transmitted to the plural nodes 810 is recorded in the data storage unit 820 provided in each of the plural nodes 810, along with a time point 990. At this time, the identical data is recorded and preserved in the data storage unit 820 provided in each of the plural nodes 810. The hash value D500 is recorded in a distributed ledger realized in a form of a block chain. Therefore, it is difficult to tamper the time point 990, and it is practically verified that data has existed at the time point 990.

In the above descriptions, an example in which the existence of one piece of image data D200 at a specific time is verified is described. However, a case where the existence of a bundle of plural consecutive pieces of image data D200 at the specific time may be provided. In this case, the existence of new image data (set as image data D210) may be desired to be verified by associating the new image data D210 to the image data D200 of which the existence at the specific time has been already verified.

Figure 8:
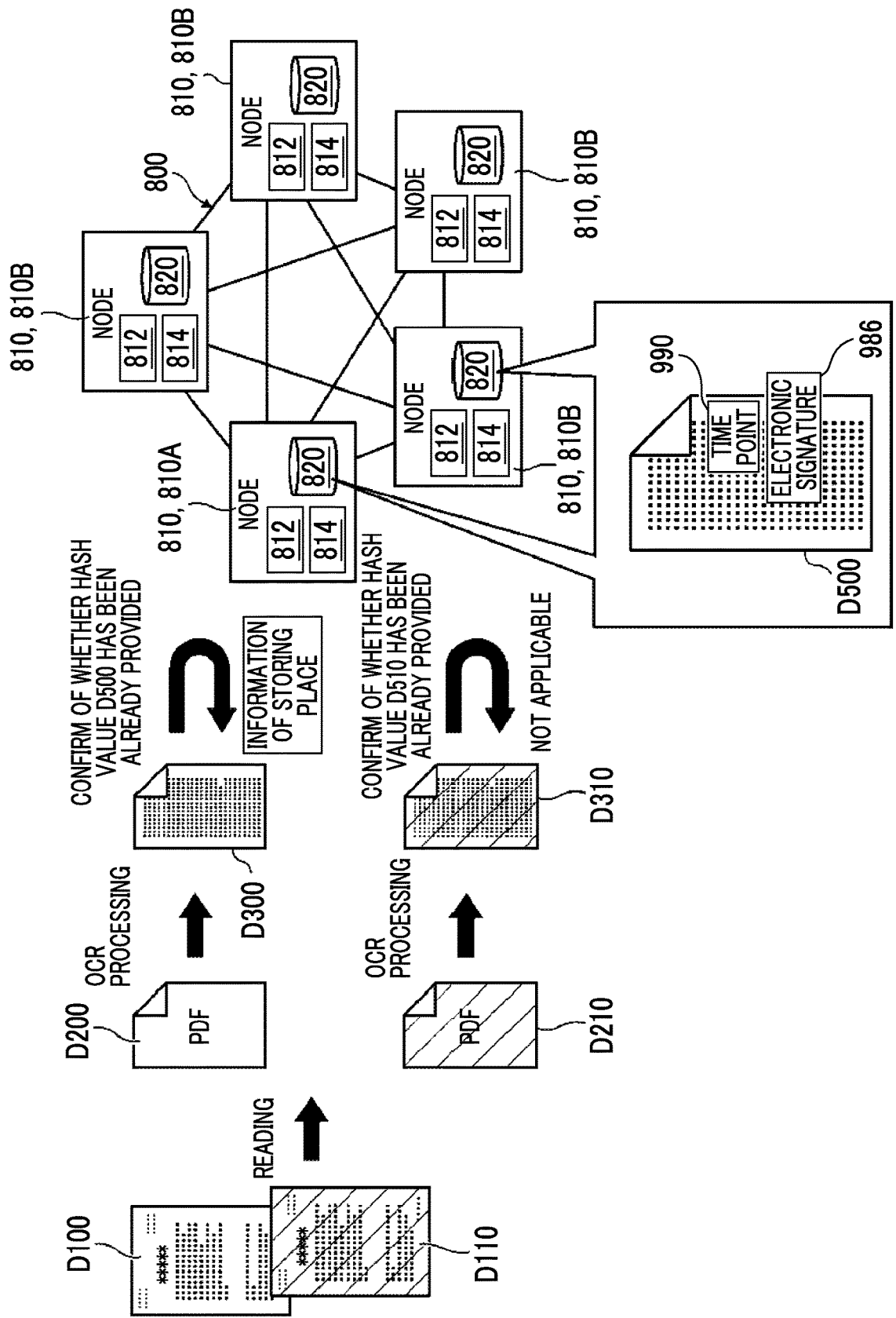
FIG. 8 is a first diagram illustrating processing of verifying the existence of another piece of data in a manner that the data processing device including the second example of the assigning unit associates the other piece of data with data of which an existence has been already verified.
Figure 9:
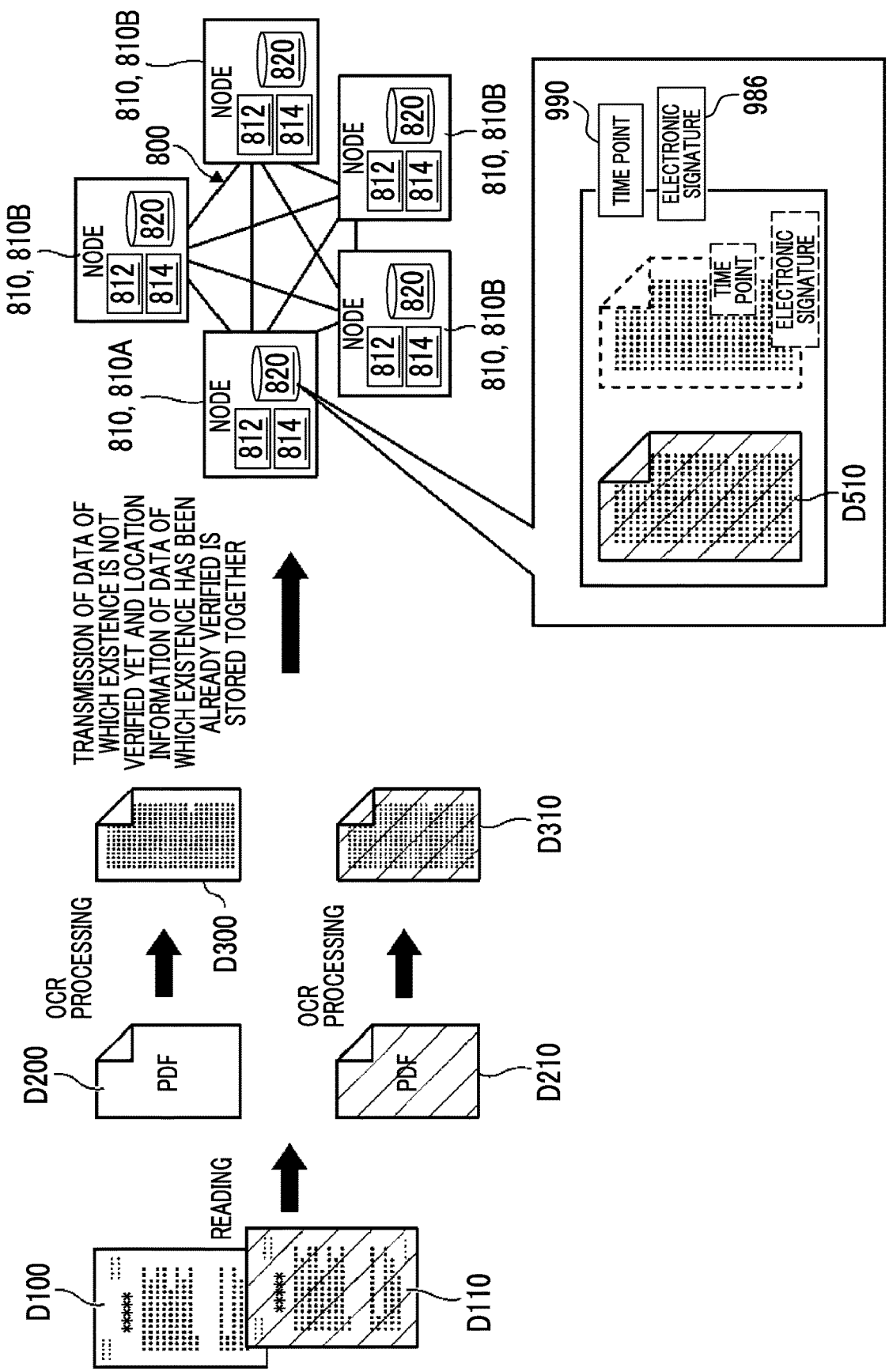
FIG. 9 is a second diagram illustrating the processing of verifying the existence of the other piece of data in a manner that the data processing device including the second example of the assigning unit associates the other piece of data with the data of which the existence has been already verified.

FIGS. 8 and 9 illustrate a specific example of an example of processing in which the existence of new image data is verified by associating the new image data to image data of which the existence at the specific time has been already verified, in the data processing device 10 including the second example of the assigning unit 150.

In the following descriptions, image data of which the existence at the specific time has been already verified is set as image data D200. A paper document as the source of the image data D200 is set as a paper document D100. Text data obtained by converting the image data D200 is set as text data D300. A hash value generated from the text data D300 is set as a hash value D400. A hash value of the text data D300 with an electronic signature is set as a hash value D500. It is assumed that the hash value D500 is stored in all plural data storage units 820.

In the following descriptions, image data of which the existence is desired to be newly verified by association with the image data D200 is set as image data D210. A paper document as the source of the image data D210 is set as a paper document D110. Text data obtained by converting the image data D210 is set as text data D310. A hash value generated from the text data D310 is set as a hash value D410. A hash value of the text data D310 with an electronic signature is set as a hash value D510.

As illustrated in FIG. 8, in the processing, the reading device 950 simultaneously reads a paper document D100 and a paper document D110, and thus image data D200 is generated from the paper document D100, and image data D210 is generated from the paper document D110. The image data receiving unit 110 receives the image data D200 and the image data D210.

Then, the data conversion unit 120 converts the image data D200 into text data D300 and converts the image data D210 into text data D310.

Then, the hash value generation unit 130 generates a hash value D400 from the text data D300 and generates a hash value D410 from the text data D300.

Here, noise is provided in reading of the reading device 950. Therefore, previously, image data D200 read in a case where the existence of the image data D200 has been verified (see Step S10 described above) and image data D200 read for processing in this time have difficulty in being identical to each other. Therefore, a hash value which has been directly generated from the image data D200 in a case where the existence of the image data D200 has been verified and a hash value which has been directly generated from the image data D200 read for processing in this time also have difficulty in being identical to each other.

In comparison to the above case, even though noise is provided, for example, in reading, text data D300 obtained by converting the image data D200 read in a case where the existence of the image data D200 has been verified and text data D300 obtained by converting the image data D200 read for processing in this time are likely to be identical to each other. Therefore, a hash value D500 generated from the text data D300 obtained by converting the image data D200 in a case where the existence of the image data D200 has been verified and a hash value D500 generated from the text data D300 obtained by converting the image data D200 read for the processing in this time are also likely to be identical to each other.

Then, the assigning unit 150 confirms whether or not the hash value D500 and the hash value D510 are stored in each of the nodes 810 in the peer-to-peer network 800. The hash value D500 confirmed to be stored in each of the nodes 810 is stored, and the assigning unit 150 acquires address information in a block chain, which is information indicating a location in which the hash value has been stored.

As illustrated in FIG. 9, the associating unit 190 joins the hash value D510 generated from the image data D210 of which the existence has not been verified yet, to the information indicating the location in which the hash value D500 which is already provided is stored. An electronic signature 986 is assigned to data obtained by joining, and the transaction transmission unit 812 transmits the data with the electronic signature, to each of the nodes 810. Each of the nodes 810 joins the hash value D510 to location information of the hash value D500, and stores the data having an electronic signature 986 assigned thereto, along with a time point 990 at which the data has been transmitted.

In this manner, in the data processing device 10 including the second example of the assigning unit 150, the existence of the new image data D210 at a specific time is verified by associating the new image data D210 with the image data D200 of which the existence at the specific time has been already verified.

In the above descriptions, processing in a case where one of the hash value D500 relating to the paper document D100 and the hash value D510 relating to the paper document D110 is stored in each of the nodes 810 is described. On the contrary, in a case where neither the hash value D500 nor the hash value D510 is stored in the node 810, the assigning unit 150 assigns an electronic signature 986 to a hash value generated from data obtained by joining the text data D300 and the text data D310. The transaction transmission unit 812 transmits the data with the electronic signature to each of the nodes 810.

Each of the nodes 810 joins the text data D300 and the text data D310, and stores the hash value of the data with the electronic signature 986.

In a case where both the hash value D500 based on the paper document D100 and the hash value D510 based on the paper document D110 are stored in each of the nodes 810, an operator may be notified that the existences of both the image data D200 and the image data D210 at the specific time are verified, by a method, for example, displaying in a display unit (not illustrated).

Figure 10:
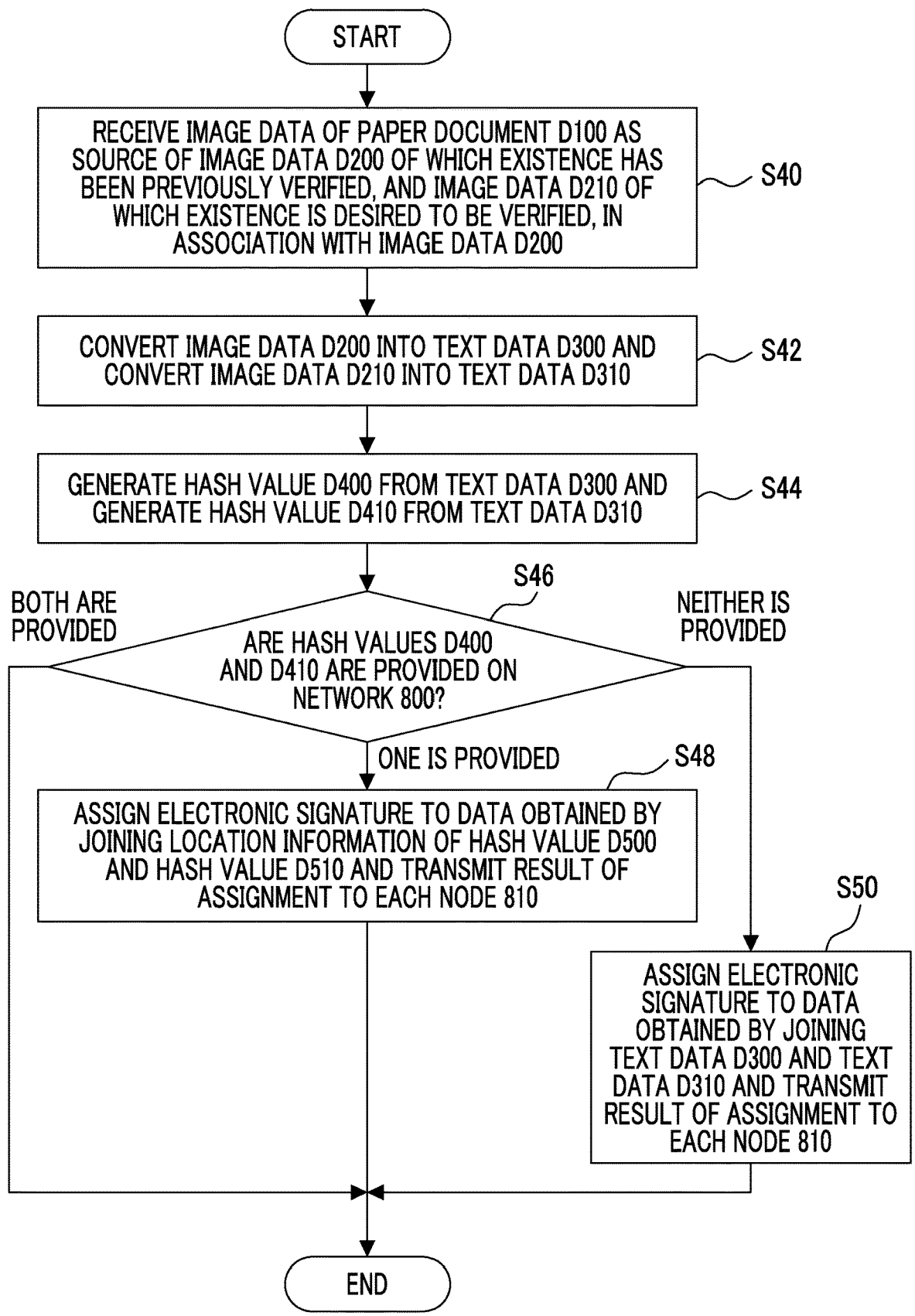
FIG. 10 is a flowchart illustrating the processing of verifying the existence of the other piece of data in a manner that the data processing device including the second example of the assigning unit associates the other piece of data with the data of which an existence has been already verified.

FIG. 10 is a flowchart illustrating a specific example of the processing in which the existence of new image data D210 is verified by associating the new image data D210 with image data D200 of which the existence at the specific time has been already verified, in the data processing device 10 including the second example of the assigning unit 150.

As illustrated in FIG. 10, in Step S40 which is a first step, the image data receiving unit 110 receives new image data D200 of a paper document D100 as the source of image data D200 of which the existence has been previously verified, and image data D210 of which the existence is desired to be verified by association with the image data D200.

In Step S42 which is the next step, the data conversion unit 120 converts the image data D200 into text data D300 again, and converts image data D210 into text data D310.

In Step S44 which is the next step, the hash value generation unit 130 generates a hash value D500 based on the text data D300 and generates a hash value D510 based on the text data D310.

In Step S46 which is the next step, it is confirmed whether or not the hash value D500 and the hash value D510 are stored in each of the nodes 810.

In a case where the existences of both the hash value D500 and the hash value D510 are confirmed in Step S46, a series of processes ends. At this time, before the end, the operator may be notified that the existences of the image data D200 and the image data D210 at the specific time have been verified.

In a case where the existence of only one of the hash value D500 and the hash value D510 is confirmed in Step S46, the process proceeds to Step S48. In a case where the existence of neither the hash value D500 nor the hash value D510 is confirmed in Step S46, the process proceeds to Step S52.

In Step S48, the associating unit 190 in the assigning unit 150 joins the hash value of which the existence in the network 800 has not been confirmed, to location information of the hash value in the network 800, of which the existence has been confirmed. The associating unit 190 assigns an electronic signature 986 to data obtained by the joining. The data having an electronic signature 986 assigned thereto is transmitted to each of the nodes 810. For example, the associating unit 190 joins the hash value D510 of which the existence has not been confirmed to the location information of the hash value D500 of which the existence has been confirmed, and assigns an electronic signature 986 to data obtained by the joining. The data having an electronic signature 986 assigned thereto is transmitted to each of the nodes 810.

The hash value of which the existence has not been confirmed is joined to the location information of the hash value of which the existence has been confirmed, and data obtained by assigning the electronic signature 986 to the data obtained by the joining is stored in each of the nodes 810 along with the time point. For example, the hash value D510 of which the existence has not been confirmed is joined to the location information of the hash value D500 of which the existence has been confirmed, and data obtained by assigning an electronic signature 986 to data obtained by the joining is stored in each of the nodes 810.

In this manner, the existence of new image data is verified by associating the new image data with image data of which the existence at a specific time has been already verified.

In the above descriptions, an example in which the existence of new image data is verified by associating the new image data with image data of which the existence at a specific time has been already verified, and by using the second example of the assigning unit 150 is described. However, the existence of new image data may be verified by associating the new image data with image data of which the existence at a specific time has been already verified, and by using the first example of the assigning unit 150.

Figure 11:
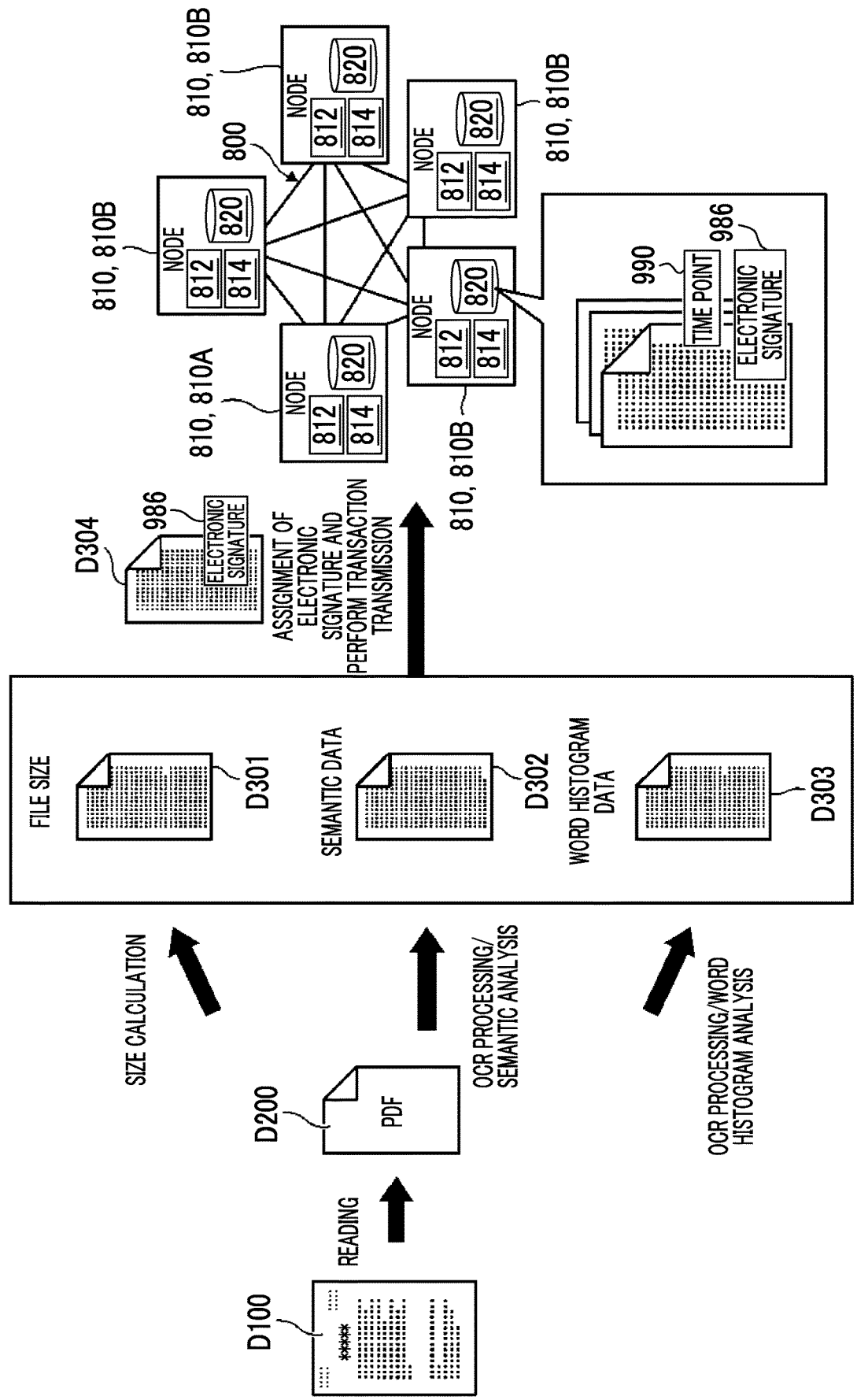
FIG. 11 is a diagram illustrating a first example of the processing of verifying the existence of the data with the electronic signature in a manner that the data processing device including the second example of the assigning unit assigns the electronic signature to the data.

FIG. 11 illustrates a first modification example of the processing in which a node 810 constituting a peer-to-peer network 800 verifies the existence of data at a specific time in the data processing device 10 including the second example of the assigning unit 150. In the above-described exemplary embodiment, the image data D200 is converted into the text data D300 which is another one kind of data, and the hash value D500 is generated from the text data D300. On the contrary, in the modification example, plural kinds of data are generated from image data D200, the plural kinds of data are joined to each other, and a hash value of link data which is data obtained by linking is generated. The modification example will be specifically described below.

As illustrated in FIG. 11, in the first modification example, a paper document D100 is read by the reading device 950, image data D200 which is image data having, for example, a PDF format is generated, and the image data receiving unit 110 receives the generated image data D200.

Then, the data conversion unit 120 converts the image data D200 into plural kinds of data. That is, the data conversion unit 120 converts the image data D200 into file size data D301 by calculating a file size of the image data D200. The data conversion unit 120 performs OCR processing on the image data D200. The data conversion unit 120 converts the image data D200 into semantic data D302 by performing semantic analysis on text data obtained by the OCR processing. The data conversion unit 120 converts the image data D200 into word histogram data D303 by analyzing a word histogram of the text data obtained by performing the OCR processing on the image data D200.

Here, each of the file size data D301, the semantic data D302, and the word histogram data D303 is an example of another kind of data, similar to the above-described text data D300.

Then, the data conversion unit 120 generates link data D304 by joining and linking the file size data D301, the semantic data D302, and the word histogram data D303 to each other. The data conversion unit 120 generates a hash value D400 from the link data D304. The data conversion unit 120 generates an electronic signature 986 by encrypting the hash value D400 with a private key which has been prepared in advance. The data conversion unit 120 assigns the electronic signature 986 to the link data D304.

Then, the data conversion unit 120 generates a hash value D500 from the link data D304 to which the electronic signature 986 has been assigned, and the transaction transmission unit 812 transmits the hash value D500 to the plural nodes 810.

The hash value D500 transmitted to the plural nodes 810 is recorded in the data storage unit 820 provided in each of the plural nodes 810, along with a time point at which the hash value D500 has been transmitted.

In the above descriptions of the modification example, the second example (for example, see FIG. 5) of the assigning unit 150 is used as the assigning unit 150. However, the above-described first example (for example, see FIG. 2) of the assigning unit 150 may also be used as the assigning unit 150 in the modification example.

Figure 12:
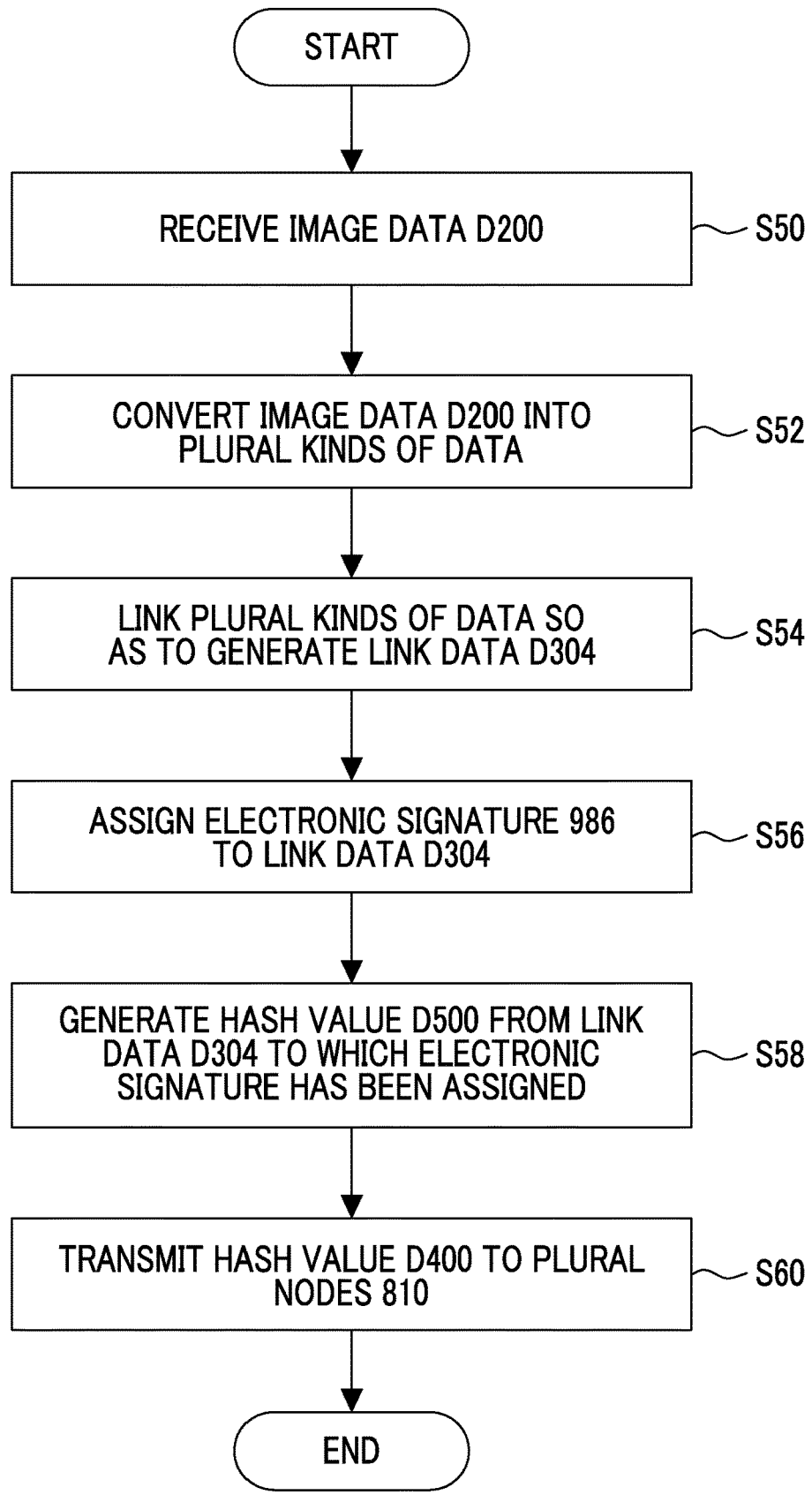
FIG. 12 is a flowchart illustrating the first example of the processing of verifying the existence of the data with the electronic signature in a manner that the data processing device including the second example of the assigning unit assigns the electronic signature to the data.

FIG. 12 is a flowchart illustrating the processing of data according to the modification example of the present invention and illustrating processing of converting image data D200 into plural kinds of data in a case where the existence of the image data D200 at a specific time is to be verified.

As illustrated in FIG. 12, in a case where a series of processes starts, in Step S50 which is a first step, the image data receiving unit 110 receives image data D200 of a paper document D100 read by the reading device 950.

In Step S52 which is the next step, the data conversion unit 120 converts the image data D200 received in Step S50 into plural kinds of data. More specifically, the data conversion unit 120 converts the image data D200 into file size data D301, converts the image data D200 into semantic data D302, and converts the image data D200 into word histogram data D303.

In Step S54 which is the next step, the assigning unit 150 generates link data D304 by linking the file size data D301, the semantic data D302, and the word histogram data D303 to each other.

In Step S56 which is the next step, the assigning unit 150 assigns an electronic signature 986 to the link data D304 generated in Step S54.

In Step S58 which is the next step, the assigning unit 150 generates a hash value D400 from the link data D304 with the electronic signature 986.

In Step S60, the transaction transmission unit 812 in the assigning unit 150 transmits the hash value D500 to plural nodes 810, and a series of processes ends.

The hash value D500 transmitted to the plural nodes 810 is recorded in the data storage unit 820 provided in each of the nodes 810, along with a time point 990.

Figure 13:
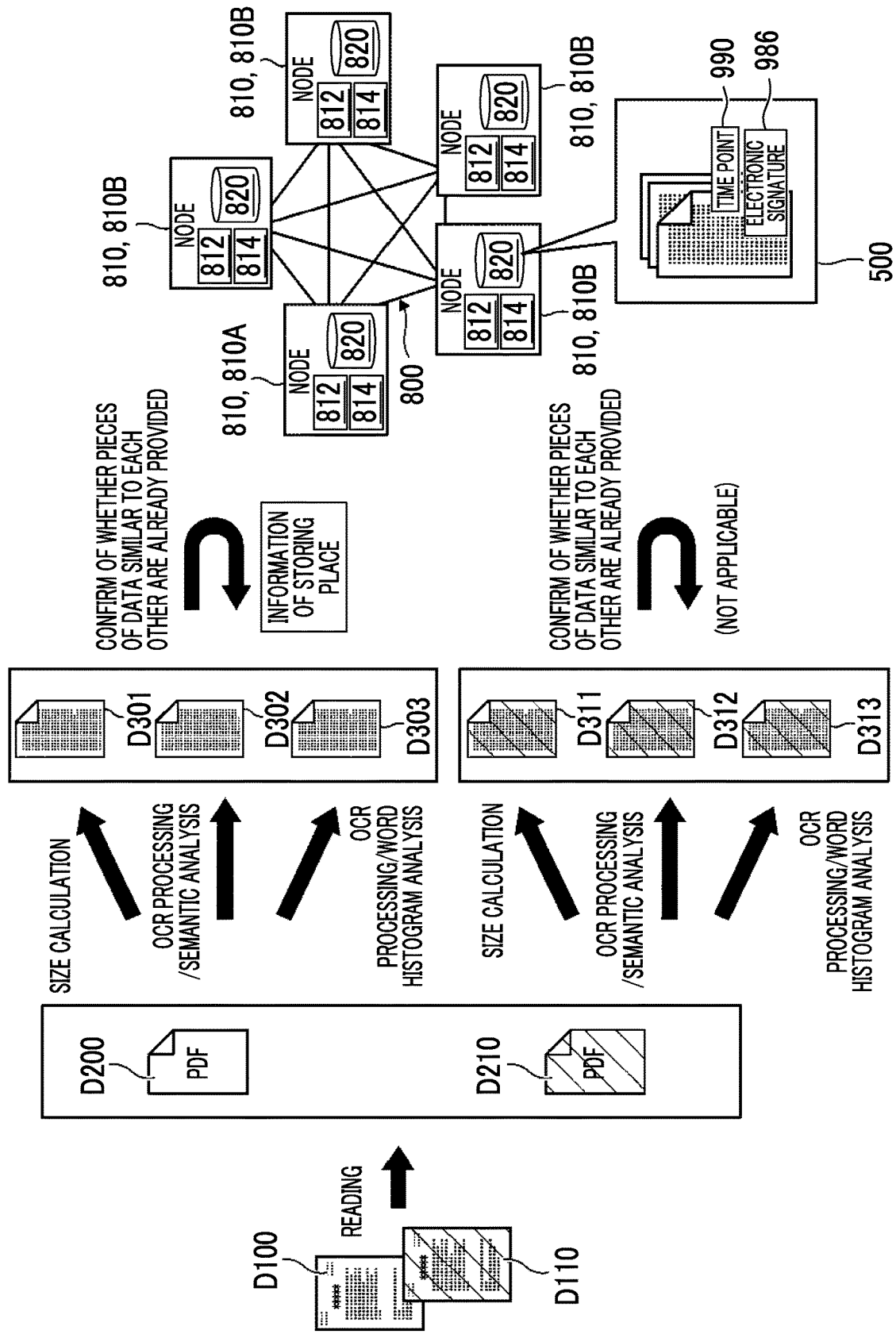
FIG. 13 is a first diagram illustrating a second example of the processing of verifying the existence of the other piece of data in a manner that the data processing device including the second example of the assigning unit associates the other piece of data with the data of which an existence has been already verified.
Figure 14:
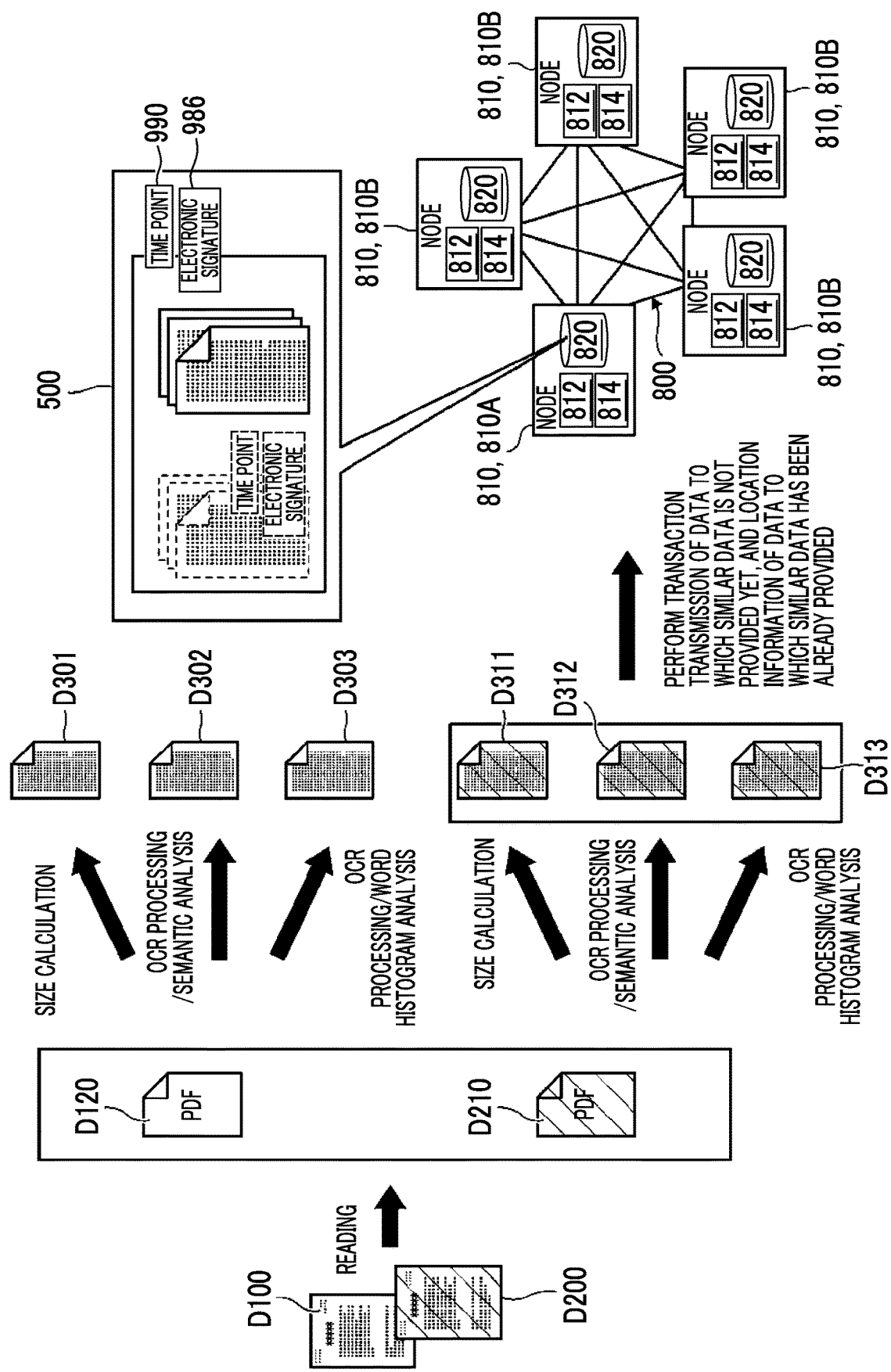
FIG. 14 is a second diagram illustrating the second example of the processing of verifying the existence of the other piece of data in a manner that the data processing device including the second example of the assigning unit associates the other piece of data with the data of which an existence has been already verified.

FIGS. 13 and 14 illustrate a modification example of the processing in which the existence of new image data D210 at a specific time is verified by associating the new image data D210 with image data D200 of which the existence at the specific time has been already verified.

In the following descriptions, image data of which the existence at a specific time has been already verified is set as image data D200. A paper document as the source of the image data D200 is set as a paper document D100. File size data obtained by conversion from the image data D200 is set as file size data D301. Semantic data obtained by conversion from the image data D200 is set as semantic data D302. Word histogram data obtained by conversion from the image data D200 is set as word histogram data D303. Data obtained by linking the file size data D301, the semantic data D302, and the word histogram data D303 to each other is set as link data D304. A hash value generated from the link data D304 with an electronic signature is set as a hash value D500.

In the following descriptions, image data of which the existence is desired to be newly verified by association with the image data D200 is set as image data D210. A paper document as the source of the image data D210 is set as a paper document D110. File size data obtained by conversion from the image data D210 is set as file size data D311. Semantic data obtained by conversion from the image data D210 is set as semantic data D312. Word histogram data obtained by conversion from the image data D210 is set as word histogram data D313. Data obtained by linking the file size data D311, the semantic data D312, and the word histogram data D313 to each other is set as link data D314. A hash value generated from the link data D314 with an electronic signature is set as a hash value D510.

As illustrated in FIG. 13, in the processing, the reading device 950 simultaneously reads the paper document D100 and the paper document D110, and thus the image data D200 is generated from the paper document D100, and the image data D210 is generated from the paper document D110. The image data receiving unit 110 receives the image data D200 and the image data D210.

Then, the data conversion unit 120 converts the image data D200 into the file size data D301, the semantic data D302, and the word histogram data D303. The data conversion unit 120 converts the image data D210 into the file size data D311, the semantic data D312, and the word histogram data D313.

The data conversion unit 120 determines whether or not data similar to any of the file size data D301, the semantic data D302, and the word histogram data D303 is provided in the network 800. The data conversion unit 120 determines whether or not the data similar to any of the file size data D311, the semantic data D312, and the word histogram data D313 is provided in the network 800. Here, as an example of a case where the data is similar, for example, a case where a difference of a size between two pieces of data is equal to or less than a threshold may be exemplified. As another example of the case where the data is similar, a case where a correlation of a word histogram between two pieces of data is equal to or more than a predetermined threshold may be exemplified.

In the modification example, regarding two pieces of image data, in a case where at least one of plural pieces of data obtained by conversion of each of the two pieces of image data is similar, the processing is performed considering that the two pieces of image data are identical to each other. However, in a case where most of plural pieces of data obtained by conversion of each of the two pieces of image data are similar, processing of considering that the two pieces of image data are identical to each other may be performed.

The assigning unit 150 determines whether or not data similar to at least one of plural pieces of data obtained by conversion from the image data D200 is provided in the network 800 and determines whether or not data similar to at least one of plural pieces of data obtained by conversion from the image data D210 is provided in the network 800.

A case where it is determined that data similar to at least one of plural pieces of data obtained by conversion from the image data D200 is provided in the network 800, and it is determined that data obtained by conversion from the image data D210 is not provided in the network 800 will be described below as an example. However, even in a case where it is determined that the data similar to at least one of plural pieces of data obtained by conversion from the image data D210 is provided in the network 800, and it is determined that the data obtained by conversion from the image data D200 is not provided in the network 800, processing is performed in a manner similar to that in the following descriptions.

In the above-described case, as illustrated in FIG. 14, the assigning unit 150 joins plural pieces of data obtained by conversion from the image data D210, to location information of data in the network 800, which is one of plural pieces of data obtained by conversion from the image data D200 and is provided on the network 800. The assigning unit 150 assigns an electronic signature to data obtained by the joining and transmits the data with the electronic signature to each of the nodes 810.

Each of the nodes 810 joins plural pieces of data obtained by conversion from the image data D210, to location information of data in the network 800, which is provided on the network 800. The node 810 stores data obtained by assigning an electronic signature to data obtained by the joining, along with a time at which the data has been transmitted.

Figure 15:
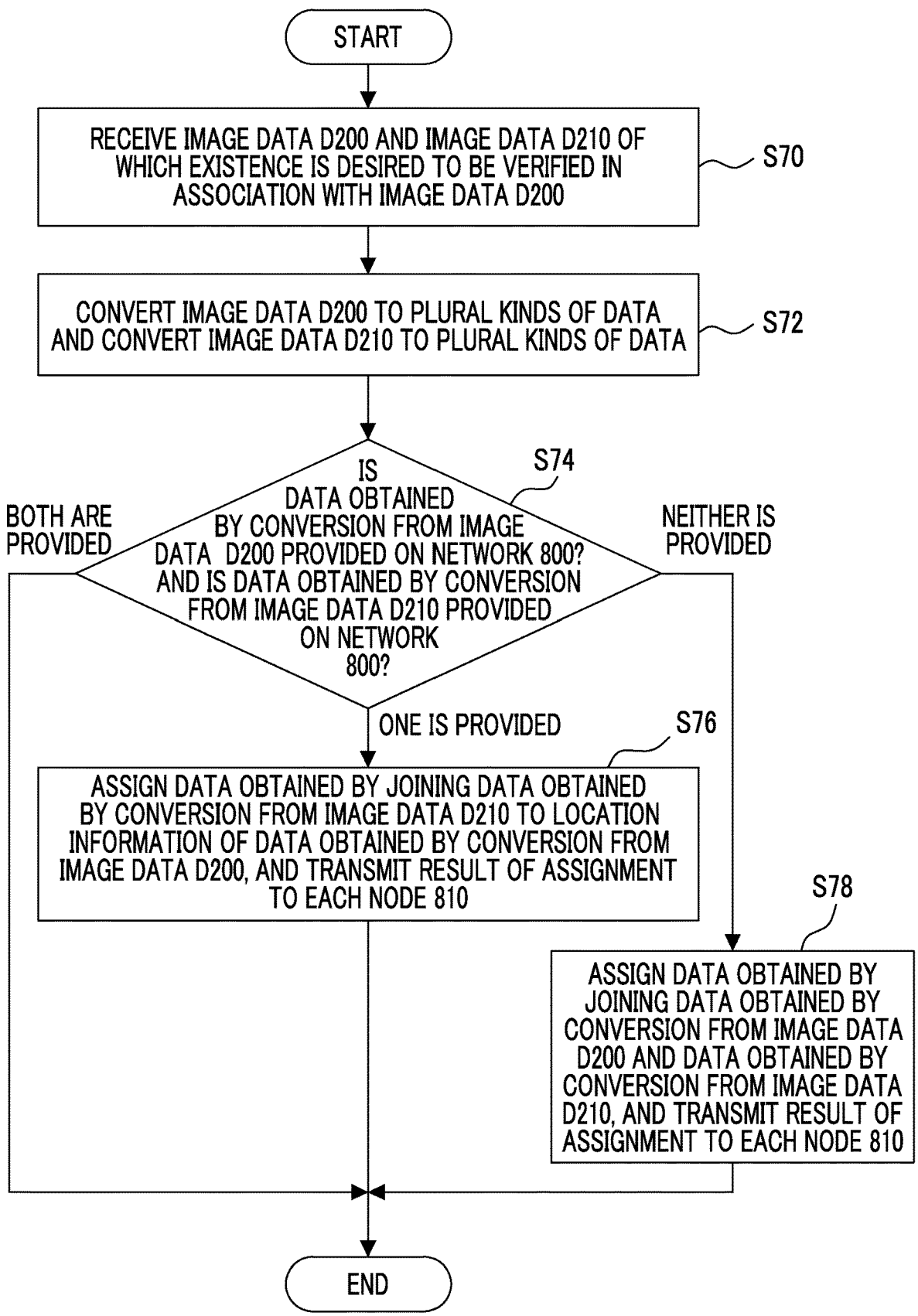
FIG. 15 is a flowchart illustrating the second example of the processing of verifying the existence of the other piece of data in a manner that the data processing device including the second example of the assigning unit associates the other piece of data with the data of which an existence has been already verified.

FIG. 15 is a flowchart illustrating the modification example of the processing in which the existence of new image data D210 is verified by associating the new image data D210 with image data D200 of which the existence at the specific time has been already verified.

As illustrated in FIG. 15, in Step S70 which is a first step, the image data receiving unit 110 receives new image data D200 of a paper document D100 as the source of image data D200 of which the existence has been previously verified, and image data D210 of which the existence is desired to be verified by association with the image data D200.

In Step S72 which is the next step, the data conversion unit 120 converts the image data D200 into plural kinds of data. That is, the data conversion unit 120 converts the image data D200 into file size data D301, semantic data D302, and word histogram data D303. The data conversion unit 120 converts the image data D210 into plural kinds of data. That is, the data conversion unit 120 converts the image data D210 into file size data D311, semantic data D312, and word histogram data D313.

In Step S74 which is the next step, the data conversion unit 120 confirms whether or not data obtained by conversion from the image data D200 is provided in the network 800. That is, the data conversion unit 120 confirms whether or not at least one of the file size data D301, the semantic data D302, or the word histogram data D303 is provided in the network 800. The data conversion unit 120 confirms whether or not data obtained by conversion from the image data D210 is provided in the network 800. That is, the data conversion unit 120 confirms whether or not at least one of the file size data D311, the semantic data D312, or the word histogram data D313 is provided in the network 800.

In a case where it is confirmed that both of the data obtained by conversion from the image data D200 and the data obtained by conversion from the image data D210 are provided in the network 800, in Step S74, a series of processes ends. In a case where it is confirmed that only one of the data obtained by conversion from the image data D200 and the data obtained by conversion from the image data D210 is provided, in Step S74, the process proceeds to Step S76. In a case where the existences of both the data obtained by conversion from the image data D200 and the data obtained by conversion from the image data D210 in the network 800 are not confirmed, in Step S74, the process proceeds to Step S78.

In Step S76, location information of data (obtained by conversion from the image data D200 of which the existence has been confirmed) in the network 800 is acquired. The file size data D311, the semantic data D312, and the word histogram data D313 which are data obtained by conversion from the image data D210 of which the existence has not been confirmed are joined to the acquired location information. An electronic signature 986 is assigned to data obtained by the joining, and the data to which the electronic signature has been assigned is transmitted to each of the nodes 810 in the network 800.

The plural kinds of data obtained by conversion from the image data D210 are joined to the location information of the data acquired from the image data D200. The data to which an electronic signature 986 has been assigned is recorded in each of the nodes 810 in the network 800, along with a time point at which the data has been transmitted.

As described above, even in the example, the existence of new image data is verified by associating the new image data with image data of which the existence at a specific time has been already verified.

In Step S78, plural kinds of data obtained by conversion from the image data D200 and plural kinds of data obtained by conversion from the image data D210 are joined to each other. An electronic signature 986 is assigned to data obtained by the joining. The data to which the electronic signature has been assigned is transmitted to each of the nodes 810 in the network 800.

The transmitted data is stored in each of the nodes 810, along with a time point at which the data has been transmitted.

Figure 16:
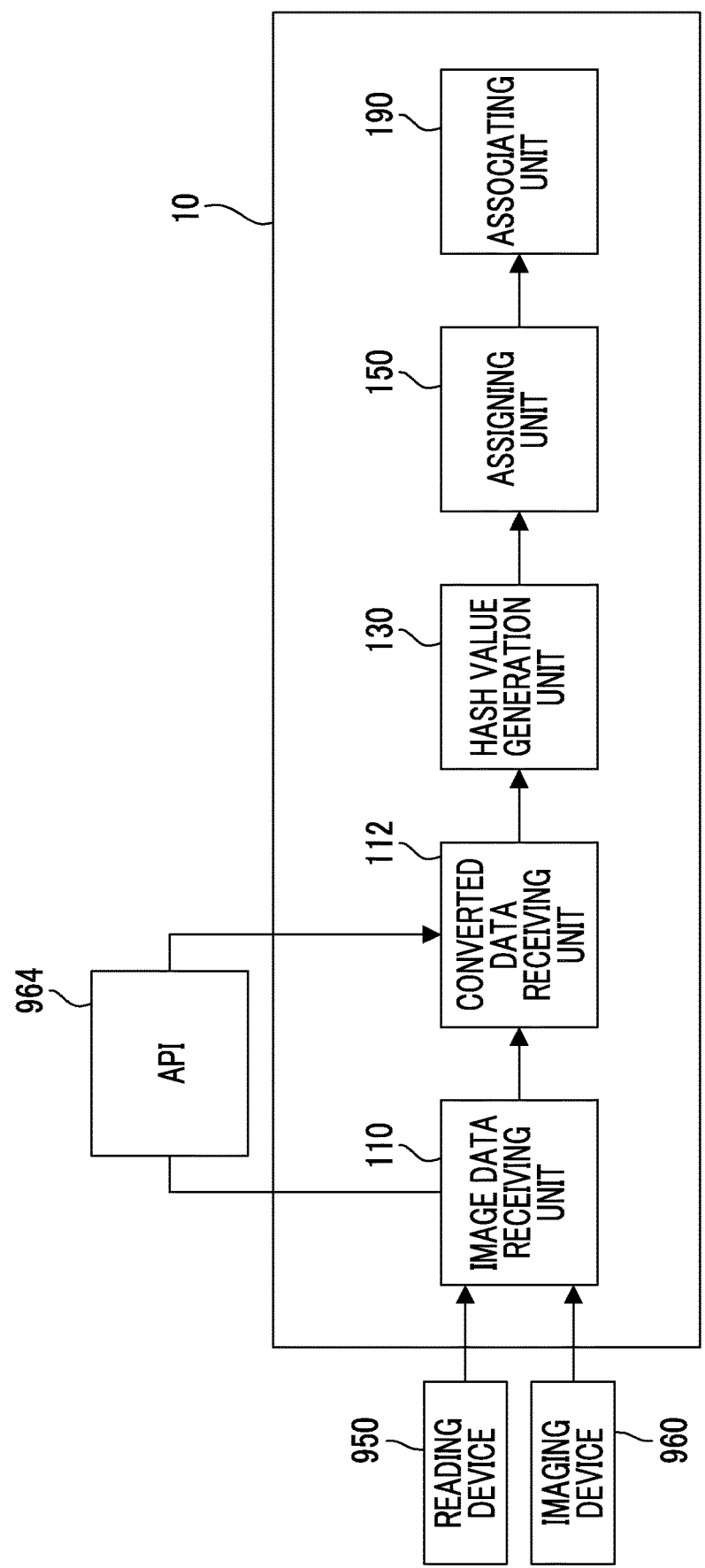
FIG. 16 is a schematic block diagram illustrating a configuration of a data processing device according to a second exemplary embodiment.

FIG. 16 illustrates a second exemplary embodiment of the data processing device 10. In the above-described first exemplary embodiment, the data processing device 10 includes the data conversion unit 120, and the data conversion unit 120 converts image data received by the image data receiving unit 110 into another kind of data. On the contrary, in the second exemplary embodiment, an API 964 which is an application programming interface (API) of a device other than the data processing device 10 and is provided instead of the data conversion unit 120 converts image data into another kind of data. The data processing device 10 includes a converted data receiving unit 112 that receives data obtained by conversion of the API.

In the above-described first example of the data processing device 10, the hash value generation unit 130 generates a hash value of another kind of data obtained by the data conversion unit 120 converting image data. On the contrary, in the modification example, the hash value generation unit 130 generates a hash value of another kind of data received by the converted data receiving unit 122. The second exemplary embodiment is identical to the above-described first exemplary embodiment except for points described above, and thus descriptions of the identical part will be omitted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing device comprising:

a memory; and a processor, configured to receive image data, convert the image data into converted data having a format different from a format of the image data, and generate a hash value of the converted data from the image data, wherein existence of the image data has been previously verified in a network, wherein the processor is further configured to receive new image data, convert the new image data into new converted data having a format different from a format of the new image data, and generate a new hash value of the new converted data from the new image data, wherein the processor is further configured to determine whether the hash value and the new hash value are provided on the network, wherein the processor is further configured to assign electronic signature to data obtained by joining location information of the new hash value of the new data and the hash value of the data in a case where only one of the hash value and the new hash vale is provided on the network, wherein the processor assigns electronic signature to data obtained by joining the converted data and the new converted data in a case where the hash value and the new hash vale are not provided on the network.

2. The data processing device according to claim 1, wherein the processor is further configured to assign an electronic signature to the converted data.

3. The data processing device according to claim 2, wherein the processor is further configured to assign a time stamp to the converted data.

4. The data processing device according to claim 3, wherein the processor is further configured to associate one piece of the image data with another piece of the image data in a state where the existence of the one piece of the image data has been already verified.

5. The data processing device according to claim 2, wherein the processor is further configured to transmit the hash value, wherein the hash value transmitted by the processor is stored in a plurality of nodes constituting a peer-to-peer network, along with a transmission time point.

6. The data processing device according to claim 5, wherein the processor is further configured to associate one piece of the image data with another piece of the image data in a state where the existence of the one piece of the image data has been already verified.

7. The data processing device according to claim 2, wherein the processor is further configured to transmit the hash value, wherein the hash value transmitted by the processor is stored in a distributed ledger of a block chain.

8. The data processing device according to claim 7, wherein the processor is further configured to associate one piece of the image data with another piece of the image data in a state where the existence of the one piece of the image data has been already verified.

9. The data processing device according to claim 2, wherein the processor is further configured to associate one piece of the image data with another piece of the image data in a state where the existence of the one piece of the image data has been already verified.

10. The data processing device according to claim 9, wherein the processor converts the image data into plural kinds of data, and in a case where plural kinds of data converted from one piece of the image data are similar to at least one of plural kinds of data converted from another piece of the image data, the processor associates the other piece of the image data with the one piece of the image data.

11. The data processing device according to claim 1, wherein the processor is further configured to assign a time stamp to the converted data.

12. The data processing device according to claim 11, wherein the processor is further configured to associate one piece of the image data with another piece of the image data in a state where the existence of the one piece of the image data has been already verified.

13. The data processing device according to claim 1, wherein the processor is further configured to transmit the hash value, wherein the hash value transmitted by the processor is stored in a plurality of nodes constituting a peer-to-peer network, along with a transmission time point.

14. The data processing device according to claim 13, wherein the processor is further configured to associate one piece of the image data with another piece of the image data in a state where the existence of the one piece of the image data has been already verified.

15. The data processing device according to claim 1, wherein the processor is further configured to transmit the hash value, wherein the hash value transmitted by the processor is stored in a distributed ledger of a block chain.

16. The data processing device according to claim 15, wherein the processor is further configured to associate one piece of the image data with another piece of the image data in a state where the existence of the one piece of the image data has been already verified.

17. The data processing device according to claim 1, wherein the processor is further configured to associate one piece of the image data with another piece of the image data in a state where the existence of the one piece of the image data at a specific time has been already verified.

18. The data processing device according to claim 17, wherein the processor converts the image data into plural kinds of data, and in a case where plural kinds of data converted from one piece of the image data are similar to at least one of plural kinds of data converted from another piece of the image data, the processor associates the other piece of the image data with the one piece of the image data.

19. The data processing device according to claim 17, wherein the processor converts the image data into plural kinds of data, and in a case where plural kinds of data converted from one piece of the image data are similar to most of plural kinds of data converted from another piece of the image data, the processor associates the other piece of the image data with the one piece of the image data.

20. A data processing device comprising:

a memory; and a processor, configured to receive image data, receive converted data which has been obtained by converting the image data and has a format different from a format of the image data, and generate a hash value of the converted data, wherein existence of the image data has been previously verified in a network, wherein the processor is further configured to receive new image data, receive new converted data which has been obtained by converting the image data and has a format different from a format of the new image data, and generate a new hash value of the new converted data from the new image data, wherein the processor is further configured to determine whether the hash value and the new hash value are provided on the network, wherein the processor is further configured to assign electronic signature to data obtained by joining location information of the new hash value of the new data and the hash value of the data in a case where only one of the hash value and the new hash vale is provided on the network, wherein the processor assigns electronic signature to data obtained by joining the converted data and the new converted data in a case where the hash value and the new hash vale are not provided on the network.

* * * * *